May 30, 1939.    N. SEVERINGHAUS    2,160,789
DUMP BODY FOR TRUCKS
Filed Jan. 28, 1937    3 Sheets-Sheet 3

Inventor
Nelson Severinghaus
By C.A.Snow&Co.
Attorneys

Patented May 30, 1939

2,160,789

UNITED STATES PATENT OFFICE 2,160,789

DUMP BODY FOR TRUCKS

Nelson Severinghaus, Lithonia, Ga., assignor to Consolidated Quarries Corporation, Atlanta, Ga.

Application January 28, 1937, Serial No. 122,866

2 Claims. (Cl. 298—18)

This invention relates to dump bodies for trucks and while it is especially useful in the handling of crushed stone, it can also be employed advantageously for the purpose of hauling and dumping other materials which maintain a steep or high angle of pile.

An object of the invention is to provide a truck body one side of which is constantly open, said body being adapted to tilt transversely for the purpose of dumping the load through the open side.

A further object is to provide a dump body the side of which provides a low loading level which is advantageous either when loading by hand or with shovel.

A further object is to provide a dump body which is of rigid construction and is subject to less distortion or deformation than bodies of the usual types.

A still further object is to provide a side dump body so formed as to more quickly and thoroughly deliver its contents than other types and which has a low center of gravity so as to reduce greatly the strains to which the chassis of the truck is subjected.

Another object is to so mount the body as to reduce the strain on the springs, body and the entire chassis during the dumping operation.

A further object is to provide a dump body which is cheap to manufacture and can be more readily handled both in loading and unloading than other types of dump bodies.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 4 is a plan view of one corner portion of the body.

Figure 1:
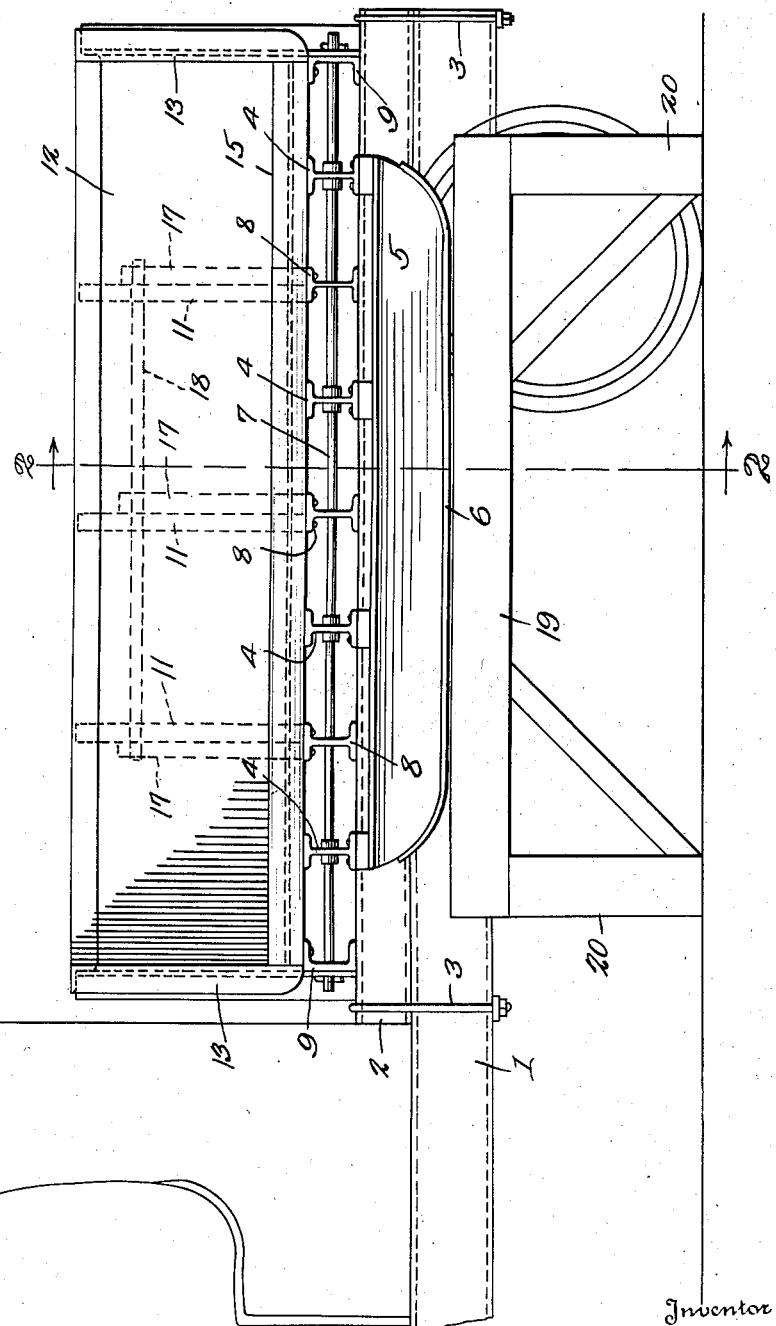
Figure 1 is a side elevation of a portion of a truck provided with a dump body constructed in accordance with the present invention, said dump body being shown in position at the point of delivery.

Referring to the figures by characters of reference I designates the chassis of a truck and resting on this chassis are the longitudinal sills 2 of the body, these sills being secured to the chassis by any suitable means, such as U-bolts 3 or the like.

Transverse beams 4 are joined to the sills 2 by rivets, spot welding, or any other well known means and these beams are extended laterally beyond sills 2, those ends of the beams at the dump side of the body being at a greater distance from the sills than are the opposed ends. This will be obvious by referring to Figures 2 and 3 and is for the purpose hereinafter pointed out. Those ends of the beams 4 at the dump side of the body are joined by a longitudinal beam 5 depending therefrom and the lower end of which provides a skid or runner 6 extending longitudinally of the chassis beyond one side and forming a load transfer device.

A pivot rod 7 is extended through the beams 4 directly above beam 5 and is also extended through transverse beams 8 forming portions of the frame of the bottom of the dump body. These beams 8 normally rest on the sills 2 between beams 4 and they cooperate with the end beams 9 of the dump body to support the floor 10.

Those ends of the beams 8 remote from the pivot rod 7 project beyond the corresponding ends of the beams 4 and have standards or braces 11 affixed thereon and projecting upwardly therefrom.

To these is secured the side wall 12 of the dump body. The end walls 13 are extended upwardly from the beams 9 and cooperate with the wall 12 to provide a body open at one side. Those ends of the walls 13 at the open side are preferably inclined as shown at 14 and formed along the bottom of the body at the open side is a slight rise 15 preferably inclined as shown and which serves as a means for preventing material from slipping off of the bottom through the open side of the body. This rise can be made integral with a plate 16 constituting a top covering for the bottom of the body.

The intermediate braces at the closed side of the body are formed with extensions 17 of any desired size and shape and these are joined by a lifting rod 18 or the like extending longitudinally of the body.

As has been already stated those ends of the beams 4 extending to the dump side of the body are of greater distances from the sills 2 than are the other ends. Thus when the body is resting on the sills, as shown for example in Figure 2, the side wall 12 of the body is nearer the longitudinal center of the chassis than is the open side of the body. Thus when bulk material is piled in the body and up against the wall 12, the increased weight of material at the closed side of the body will be substantially balanced by the weight of the bulk material sloped downwardly to the rise 15 so that the center of gravity of the load will be substantially along the center of the chassis.

The rise 15 will prevent the bulk material from sliding from the body at the open side after the material has been loaded to the correct angle of pile. As one side of the body is open, it is possible to more readily load the body than where the side is closed.

Figure 2:
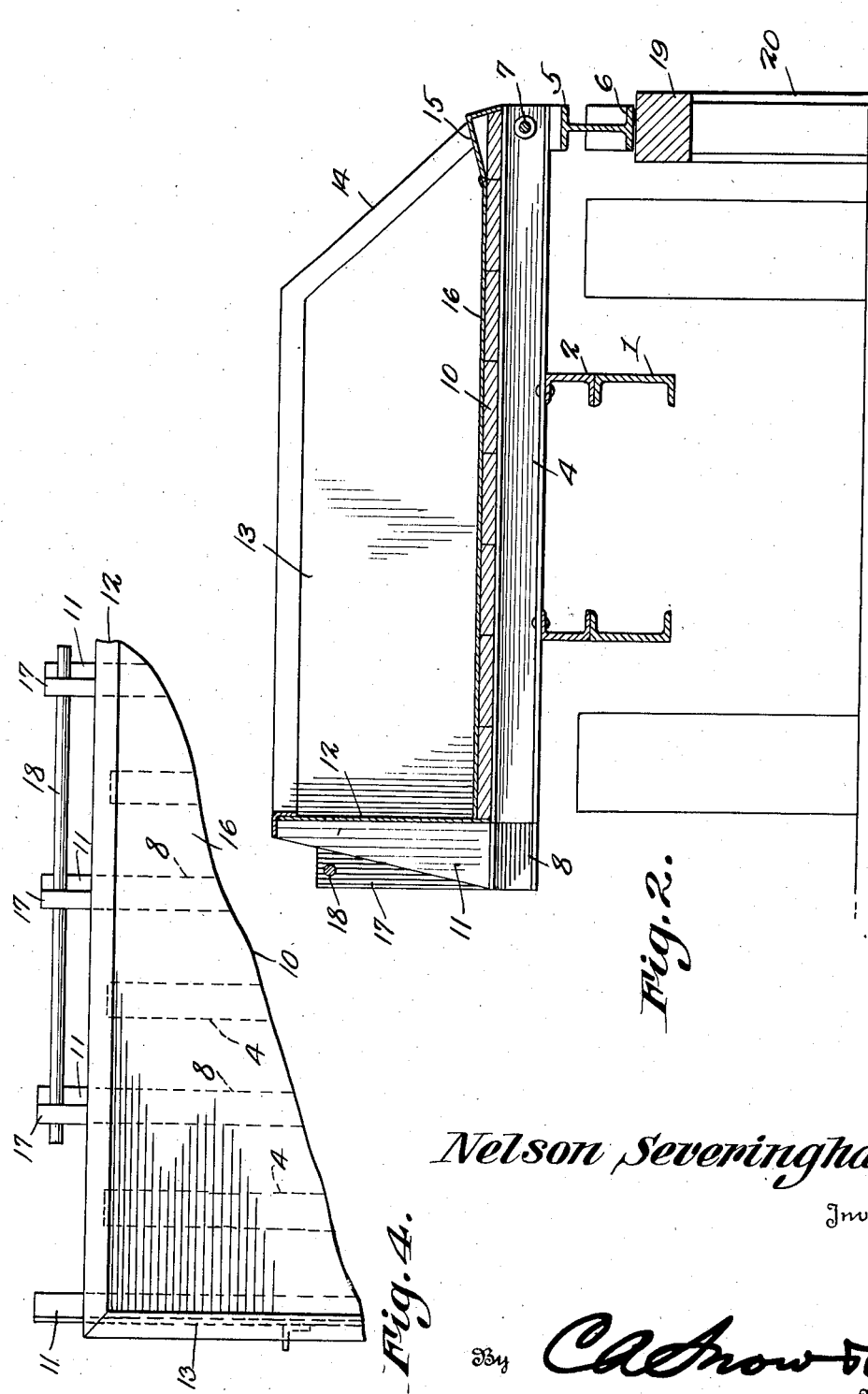
Figure 2 is a section on line 2—2, Figure 1.
Figure 3:
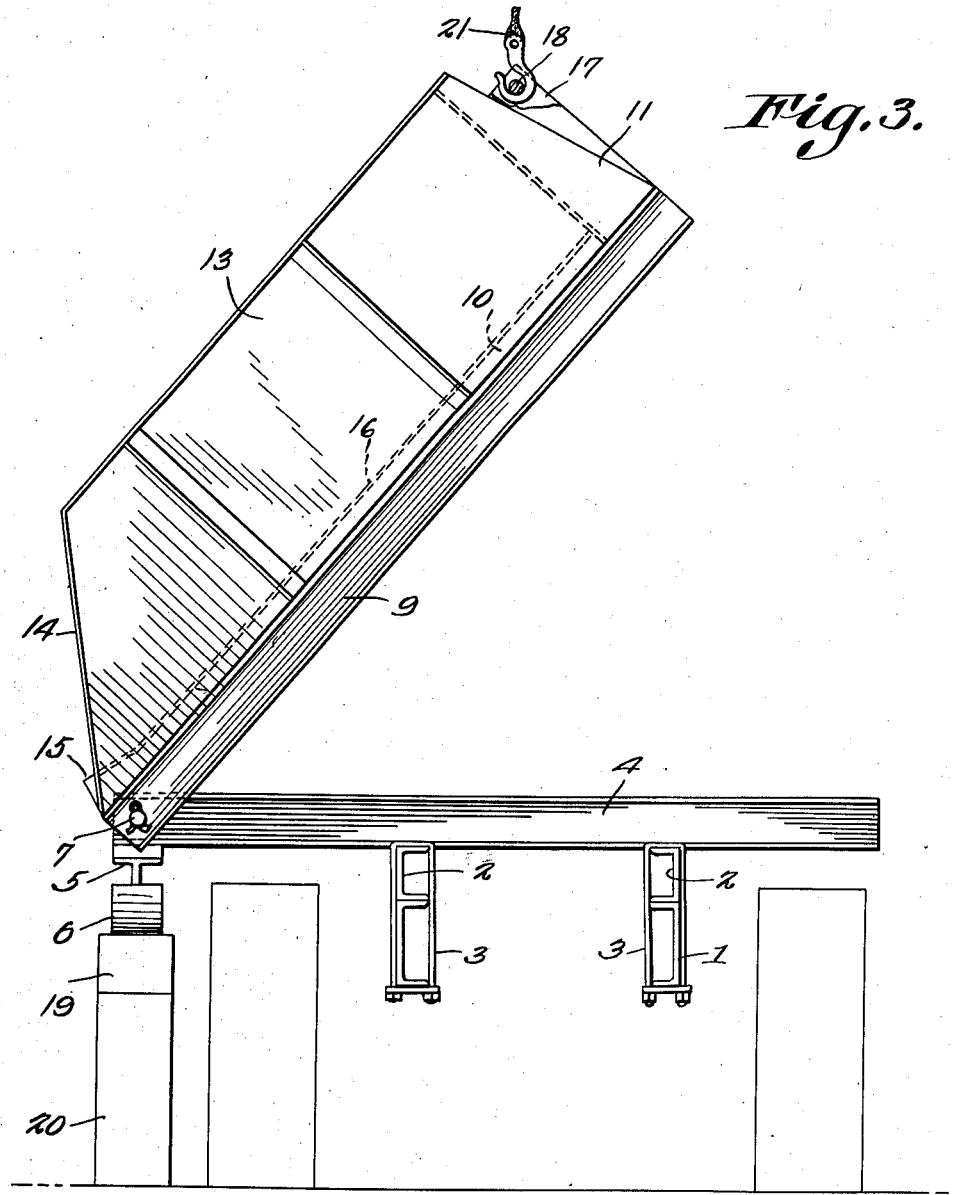
Figure 3 is an end elevation showing the body in dumping position.

At the point where the load is to be dumped, it is designed to erect a support in the form of a longitudinal beam 19 mounted on standards or other supporting means 20, the top surface of this beam being slightly below the bottom surface of the runner or skid 6. The loaded truck is driven to a position at one side of the beam so that the runner or skid 6 will be brought directly over but out of contact with the beam as shown in Figures 1 and 2. The closed side of the body is then elevated by any suitable means provided for that purpose. For example a cable hoist, a portion of which has been shown at 21, can be placed in engagement with rod 18 so as to swing the closed side of the body upwardly with rod 7 as an axis. This is shown in Figure 3. Obviously the contents of the body will then gravitate quickly from the truck. The added load at the side of the truck during this dumping operation will be transmitted through the runner or skid 6 to the beam 19 so that the springs and chassis will not be subjected to excessive lateral distortion during the dumping operation.

It is to be understood, of course, that any suitable hoist mechanism can be built into the truck for the purpose of elevating the closed side of the body, instead of providing the cable hoist shown.

By hinging the frame of the body to the sub-frame made up of the sills 2 and beams 4, the dumping can be effected at a good height and distance from the wheels of the truck and the tilt of the body can be such as to insure delivery of all of the contents of the body.

The present invention is advantageous as compared with ordinary rear dumping bodies in that it provides a body having a low center of gravity and which can be easily loaded with shovels and by hand because of the open side. This type of body is also advantageous because it does not subject the chassis to excessive strain while carrying the load or while dumping. The body can be quickly and easily brought into position for dumping and can be used for discharging material of any size, it being unnecessary to use doors and the like which quickly get out of order. It will be noted, further, that by providing a body of this type, the load can be properly centered on the chassis throughout the length of the body and would not be piled so as to bring the center of gravity to some one point away from the center of the chassis.

What is clamed is:

1. The combination with the chassis of a truck or the like, of a sub-frame rigidly secured thereon, a dump body having an open side and a closed side, said body normally resting on the sub-frame, means for pivotally connecting the open side of the body to the sub-frame for up and down swinging movement relative thereto, a longitudinal skid having all portions located beneath the sub-frame and fixedly secured thereto beneath the open side of the body, and a longitudinal rise along the bottom of the body at the open side thereof, the closed side of the body being positioned at a lesser distance from the longitudinal center of the body than the bottom of the open side whereby the center of gravity of bulk material loaded into the body and against the closed side and having its angle of pile extending downwardly toward the rise, will be substantially along the longitudinal center of the chassis of the truck.

2. The combination with the chassis of a truck or the like, and a dump body normally supported thereon, said body having one side open, of a pivotal connection between the open side of the body and the corresponding side of the chassis, and a load transfer skid fixedly attached to the chassis at the open side of the body and extending to points adjacent to the ends of the body, all parts of the skid being located beneath the chassis and body.

NELSON SEVERINGHAUS.